(12) United States Patent
Tajima

(10) Patent No.: US 8,096,687 B2
(45) Date of Patent: Jan. 17, 2012

(54) VEHICLE HEADLIGHT

(75) Inventor: Keiichi Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 169 days.

(21) Appl. No.: 12/609,866

(22) Filed: Oct. 30, 2009

(65) Prior Publication Data

US 2010/0110709 A1 May 6, 2010

(30) Foreign Application Priority Data

Oct. 31, 2008 (JP) ................... 2008-282121

(51) Int. Cl.
*B60Q 1/00* (2006.01)

(52) U.S. Cl. ........ 362/465; 362/467; 362/508; 362/512; 362/513; 362/522

(58) Field of Classification Search .......... 362/623–625, 362/530–532, 464–466, 467–468, 507; 315/92
See application file for complete search history.

(56) References Cited

U.S. PATENT DOCUMENTS

| | | | |
|---|---|---|---|
| 6,161,950 A * | 12/2000 | Tsukamoto et al. | 362/513 |
| 6,695,466 B2 * | 2/2004 | Naganawa et al. | 362/539 |
| 6,761,476 B2 * | 7/2004 | Pascutiu | 362/526 |
| 6,886,957 B2 * | 5/2005 | Uchida | 362/37 |
| 7,621,663 B2 | 11/2009 | Tajima et al. | |
| 2004/0085780 A1 | 5/2004 | Hayami | |
| 2005/0174786 A1 | 8/2005 | Tajima et al. | |
| 2007/0082577 A1 | 4/2007 | Tajima | |
| 2008/0089086 A1 | 4/2008 | Tajima et al. | |

FOREIGN PATENT DOCUMENTS

| | | |
|---|---|---|
| CN | 101162077 A | 4/2008 |
| EP | 1 920 972 A2 | 5/2008 |
| JP | 2007-128856 A | 5/2007 |
| JP | 2008-094275 A | 4/2008 |

OTHER PUBLICATIONS

Extended European Search Report for European Application No. 09172489.8-2423 dated Jan. 29, 2010, 7 pages.
English abstract of Japanese Publication No. 2008-94275 published on Apr. 24, 2008, esp@cenet database, 1 page.
English abstract of Japanese Publication No. 2007-128856 published on May 24, 2007, esp@cenet database, 1 page.
Office Action for Chinese Application No. 101162077A issued on Sep. 9, 2010 and English translation thereof, 10 pages.
English abstract of Chinese Publication No. 101162077A published on Apr. 16, 2008, espacenet database, 1 page.

* cited by examiner

*Primary Examiner* — Ali Alavi
(74) *Attorney, Agent, or Firm* — Osha • Liang LLP

(57) ABSTRACT

A vehicle head light includes a lighting casing; a lamp unit disposed in the lighting casing; a support member that supports the lamp unit so as to be rotatable at least in two directions; an actuator that rotates the lamp unit with respect to the support member; and a thrust receiver that receives a load of the lamp unit. The lighting casing includes a lamp housing opened on one side and a cover that closes the opening of the lamp housing. The lamp unit includes a light source and a reflector that reflects light emitted from the light source. The actuator is disposed under the lamp unit. A lower end of the lamp unit is coupled to the actuator. The actuator includes a case member; and a driving mechanism disposed in the case member. The lamp unit is coupled to the driving mechanism. The thrust receiver is integrally provided on the case member of the actuator.

9 Claims, 8 Drawing Sheets

VEHICLE HEADLIGHT

BACKGROUND OF THE INVENTION

1. Field of the Invention

The present invention relates to a vehicle headlight. More specifically, the present invention involves improving the workability in the assembly by integrally providing a thrust receiver that receives the load of a lamp unit, on a case member of an actuator that rotates the lamp unit in a predetermined direction.

2. Background Art

Examples of vehicle headlights include lamp units having a light source and a reflector that reflects light emitted from the light source disposed in a lighting casing constituted by a cover and a lamp housing.

Such vehicle headlights include a type in which the lamp unit is supported by a support portion such as a frame or a bracket so as to be rotatable (tiltable) and the lamp unit is rotated by the driving force of an actuator (see, for example, Patent References 1 and 2).

Patent Reference 1: JP-A-2008-094275
Patent Reference 2: JP-A-2007-128856

By the lamp unit being rotated (tilted) in the vertical direction by the actuator, a so-called leveling adjustment is performed to adjust for the optical axis shift that varies depending on the weight of the load on the vehicle. Also, by the lamp unit being rotated in the right-left direction by the actuator, a so-called swivel operation is performed to change the direction of the optical axis so as to follow the running direction of the vehicle.

In the above-described vehicle headlight that performs the leveling adjustment by the actuator, the actuator is disposed below the lamp unit, the lower end of the lamp unit is coupled to a connecting shaft provided on the actuator, and a supporting point (spherical portion) serving as the supporting point of rotation for the leveling adjustment is provided at the upper end of the lamp unit. In the leveling adjustment, by the lower end being moved in the front-rear direction by the driving force of the actuator, the lamp unit is rotated in the vertical direction about the supporting point.

In the vehicle headlight described in Patent Reference 1, the actuator includes a case member and a driving mechanism disposed in the case member. The case member includes a slide support portion and a supported portion supported by the slide support portion so as to be movable in the front-rear direction. A connecting shaft is provided as a part of the driving mechanism. In the leveling adjustment, the supported portion and the driving mechanism are integrally moved in the front-rear direction with respect to the slide support portion to rotate the lamp unit in the vertical direction.

In the vehicle headlight described in Patent Reference 2, the actuator includes a case member and a driving mechanism disposed in the case member. A connecting shaft is provided as a part of the driving mechanism. In the leveling adjustment, the connecting shaft is moved in the front-rear direction with respect to the case member to rotate the lamp unit in the vertical direction.

In the vehicle headlight performing such a leveling adjustment, a thrust receiver for receiving the load of the lamp unit is disposed between the lower end of the lamp unit and the actuator. The upper surface of the thrust receiver is a gentle arc surface that is convex downward in correspondence with the path of the rotation of the lamp unit in the leveling operation. In the leveling adjustment, the lower surface of the lamp unit slides on the upper surface of the thrust receiver, whereby a smooth rotation of the lamp unit is ensured.

In the vehicle headlights described in Patent References 1 and 2, the thrust receiver is attached to a support member such as a frame or a bracket.

However, in the vehicle headlight described in Patent Reference 1, the thrust receiver is provided as an independent part that is different from the actuator. Consequently, it is necessary to attach the actuator to predetermined parts after the thrust receiver is attached to a support member such as a frame or a bracket. Thus, the number of steps of the assembly process is large, the workability in the assembly is reduced, and the working hours are increased.

SUMMARY OF THE INVENTION

A vehicle headlight in accordance with one or more embodiments of the present invention improves the workability in the assembly.

In one or more embodiments of the present invention, a vehicle headlight is provided with: a lighting casing including a lamp housing opened on one side and a cover that closes the opening of the lamp housing; a lamp unit disposed in the lighting casing, and having a light source and a reflector that reflects light emitted from the light source; a support member that supports the lamp unit so as to be rotatable at least in two directions; and an actuator that rotates the lamp unit with respect to the support member and is disposed under the lamp unit, and to which a lower end of the lamp unit is coupled, the actuator includes: a case member; and a driving mechanism that is disposed in the case member and to which the lamp unit is coupled, and a thrust receiver that receives a load of the lamp unit is integrally provided on the case member of the actuator.

Thus, in the vehicle headlight, the thrust receiver that receives the load of the lamp unit constitutes a part of the case member of the actuator.

The vehicle headlight in accordance with one or more embodiments of the present invention is provided with: a lighting casing including a lamp housing opened on one side and a cover that closes the opening of the lamp housing; a lamp unit disposed in the lighting casing, and having a light source and a reflector that reflects light emitted from the light source; a support member that supports the lamp unit so as to be rotatable at least in two directions; and an actuator that rotates the lamp unit with respect to the support member and is disposed under the lamp unit, and to which a lower end of the lamp unit is coupled, the actuator includes: a case member; and a driving mechanism that is disposed in the case member and to which the lamp unit is coupled, and a thrust receiver that receives a load of the lamp unit is integrally provided on the case member of the actuator.

Consequently, it is unnecessary to attach the actuator to predetermined parts after the thrust receiver is attached to the support member, so that the number of steps of the assembly process is small and the workability in the assembly can be improved.

In one or more embodiments of the present invention, the actuator includes: a main unit that has the driving mechanism and moves in a front-rear direction to rotate the lamp unit in a predetermined direction; and a support portion that is attached to the support member and supports the main unit so as to be movable in the front-rear direction, so that the lamp unit can be smoothly rotated with a simple structure.

In one or more embodiments of the present invention, at least a part of the driving mechanism moves in a front-rear direction to rotate the lamp unit in a predetermined direction, so that the lamp unit can be smoothly rotated with a simple structure.

In one or more embodiments of the present invention, the support member is provided with a support member side engagement portion, the thrust receiver is provided with a receiver side engagement portion that is engaged with the support member side engagement portion, and the receiver side engagement portion is engaged with the support member side engagement portion so that at least a part of the case member of the actuator is attached to the support member. Consequently, the case member can be easily attached to the support member while the structure of the actuator is simple.

In one or more embodiments of the present invention, a plurality of support member side engagement portions of the support member are provided, the case member is provided with an elastically deformable elastic engagement portion, and the elastic engagement portion of the case member is elastically deformed to be engaged with at least one of the support member side engagement portions of the support member, so that the actuator can be easily and reliably attached to the support member.

Other aspects and advantages of the present invention will be apparent from the following description, the drawings, and the claims.

DETAILED DESCRIPTION OF THE EXEMPLARY EMBODIMENTS

A vehicle headlight in accordance with one or more embodiments of the present invention will be described with reference to the attached drawings (see FIGS. 1 to 8).

A vehicle headlight 1 is attached to each of the right and left ends at the front end of a vehicle.

Figure 1:
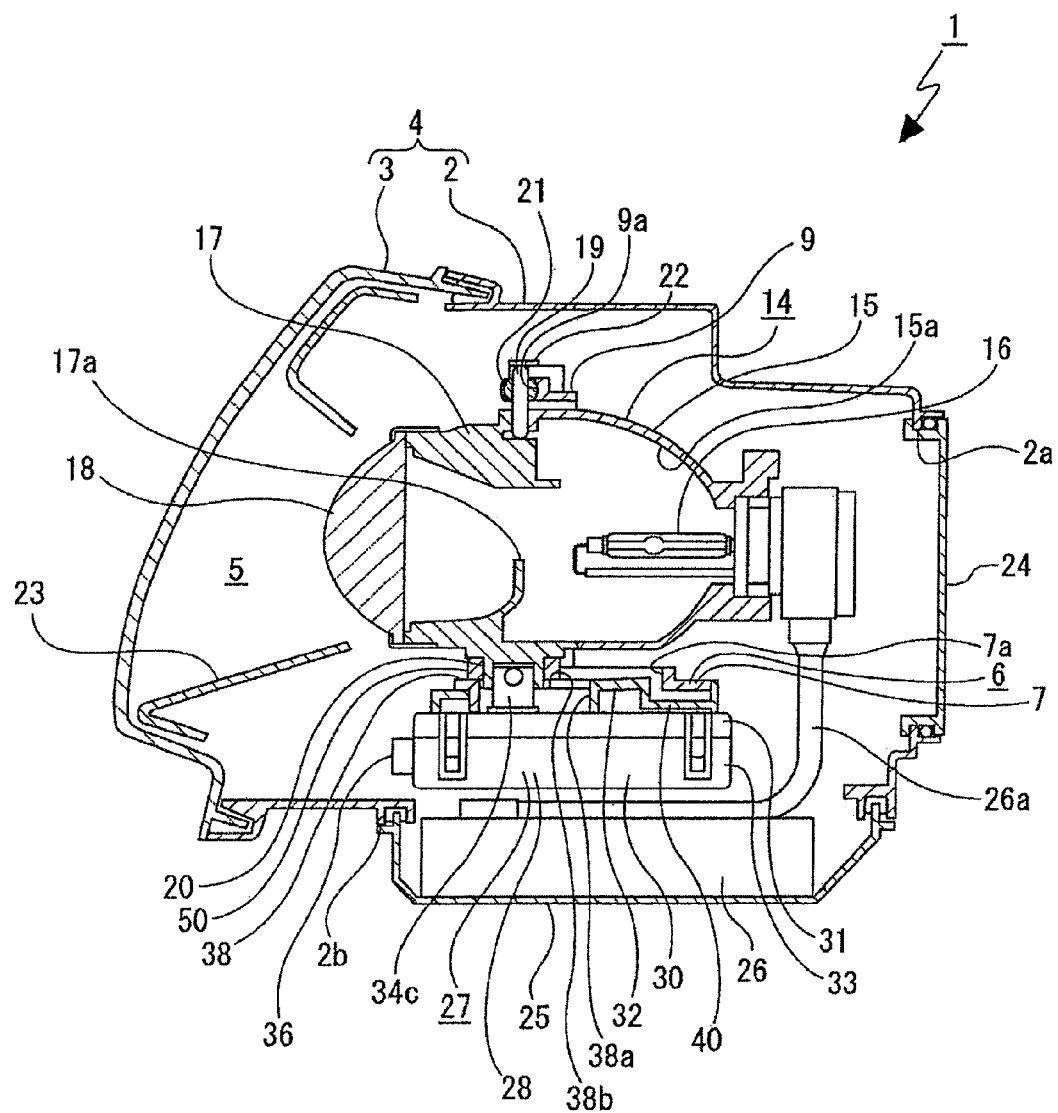
FIG. 1, as well as FIGS. 2 to 8, shows a vehicle headlight in accordance with one or more embodiments of the present invention, and is a schematic longitudinal cross-sectional view.

The vehicle headlight 1 has, as shown in FIG. 1, a lamp housing 2 having a concave portion opened on the front side and a cover 3 that closes the opening of the lamp housing 2. The lamp housing 2 and the cover 3 constitute a lighting casing 4, and the internal space of the lighting casing 4 is formed as a lighting chamber 5.

At the rear end of the lamp housing 2, an attachment opening 2a passing through in the front-rear direction is formed. At the lower end of the lamp housing 2, a disposition opening 2b passing through in the vertical direction is formed.

Figure 2:
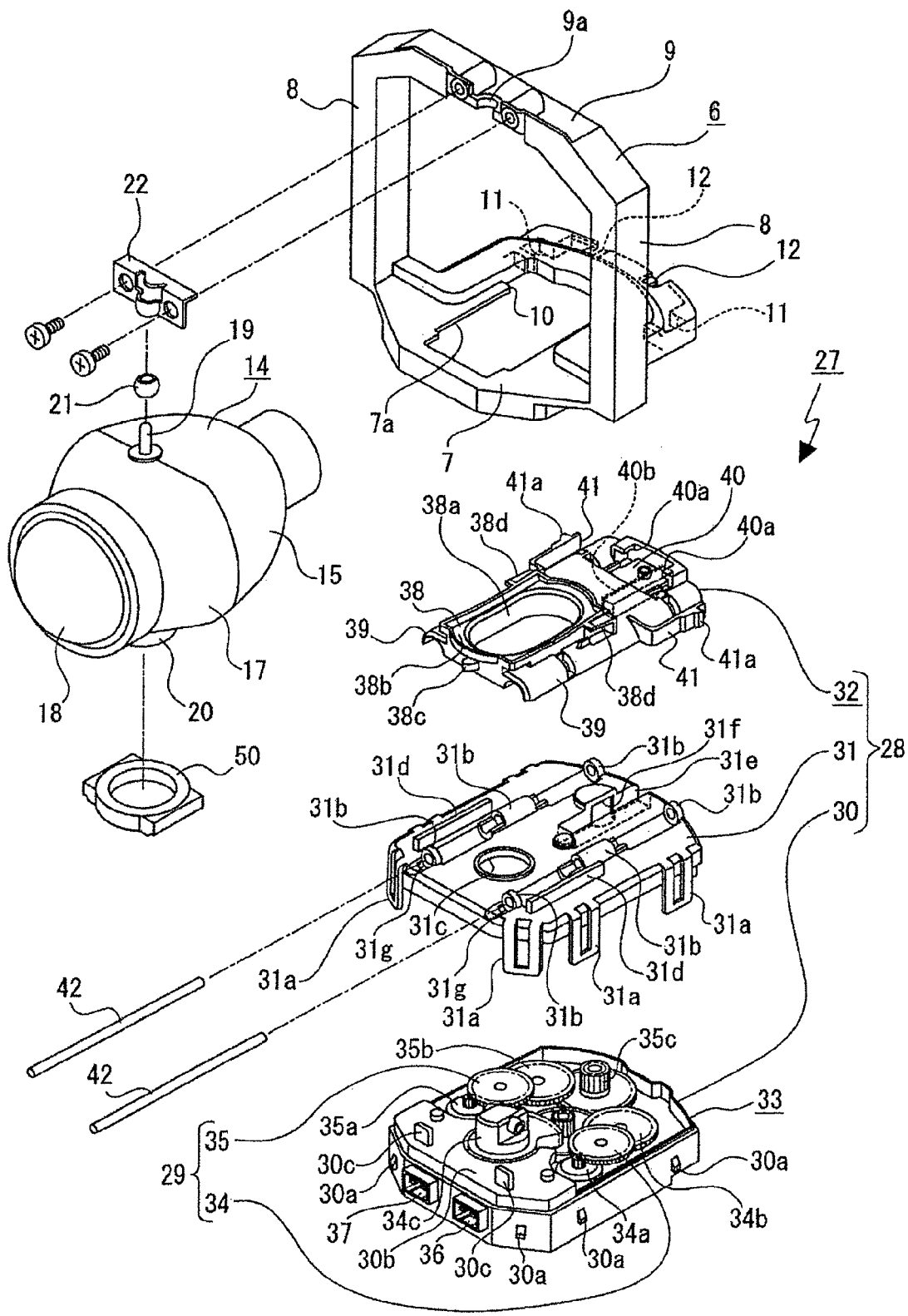
FIG. 2 is an exploded perspective view showing the internal structure with part thereof omitted.

A support member 6 is disposed in the lighting chamber 5. The support member 6 is supported so as to be tiltable in the right-left and vertical directions with respect to the lamp housing 2 by a non-illustrated aiming adjustment mechanism. The support member 6 includes, as shown in FIGS. 1 and 2, a base portion 7 oriented in the vertical direction, pillar portions 8 protruding upward from the right and left ends of the base portion 7, respectively, and a hanging portion 9 connecting the upper ends of the pillar portions 8. In a central part in the right-left direction of the hanging portion 9, a support-receiving portion 9a is formed.

Figure 3:
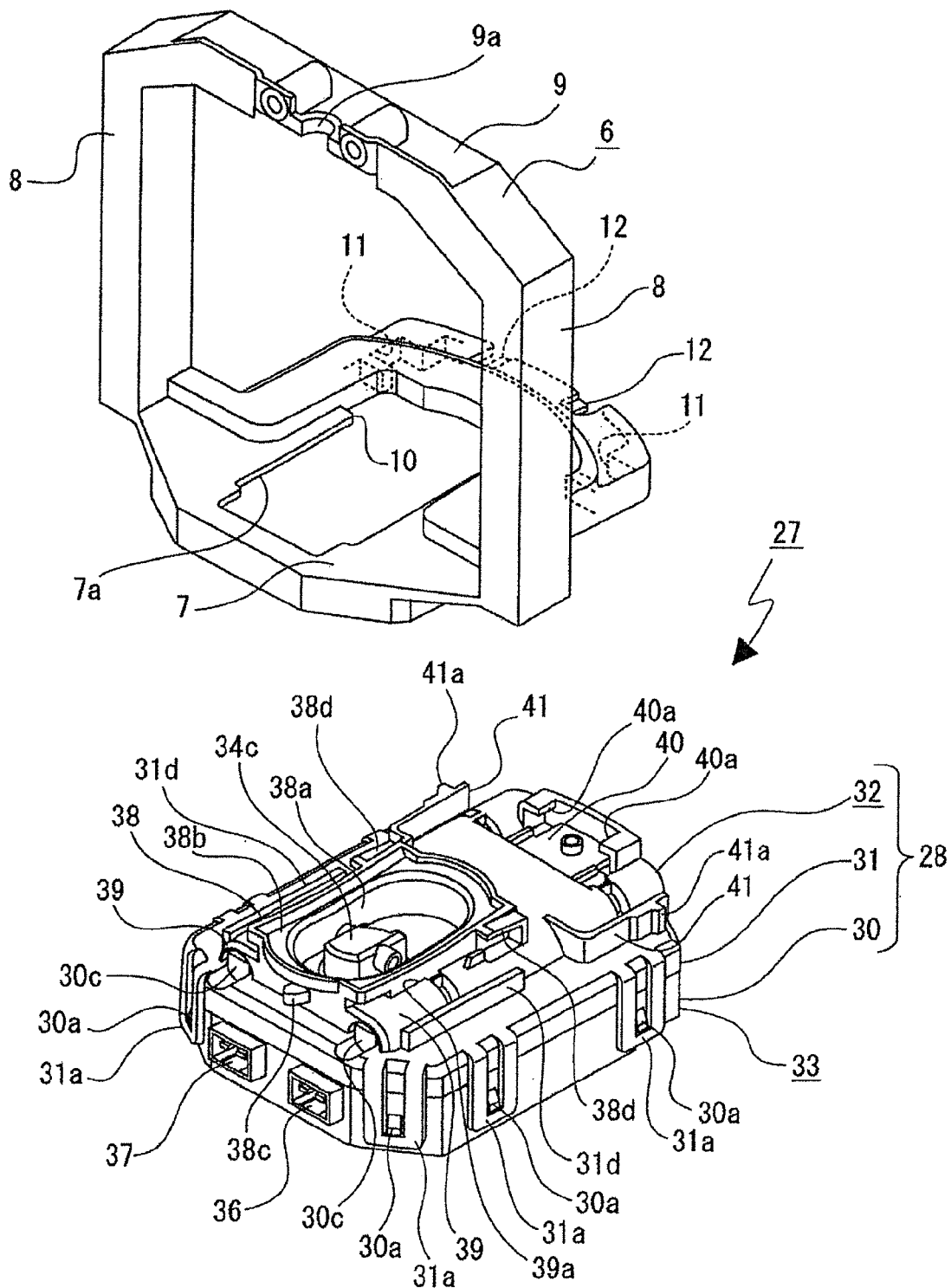
FIG. 3 is a perspective view showing the internal structure with part thereof omitted.

On the base portion 7, an attachment hole 7a passing through in the vertical direction is formed (see FIGS. 2 and 3).

Figure 4:
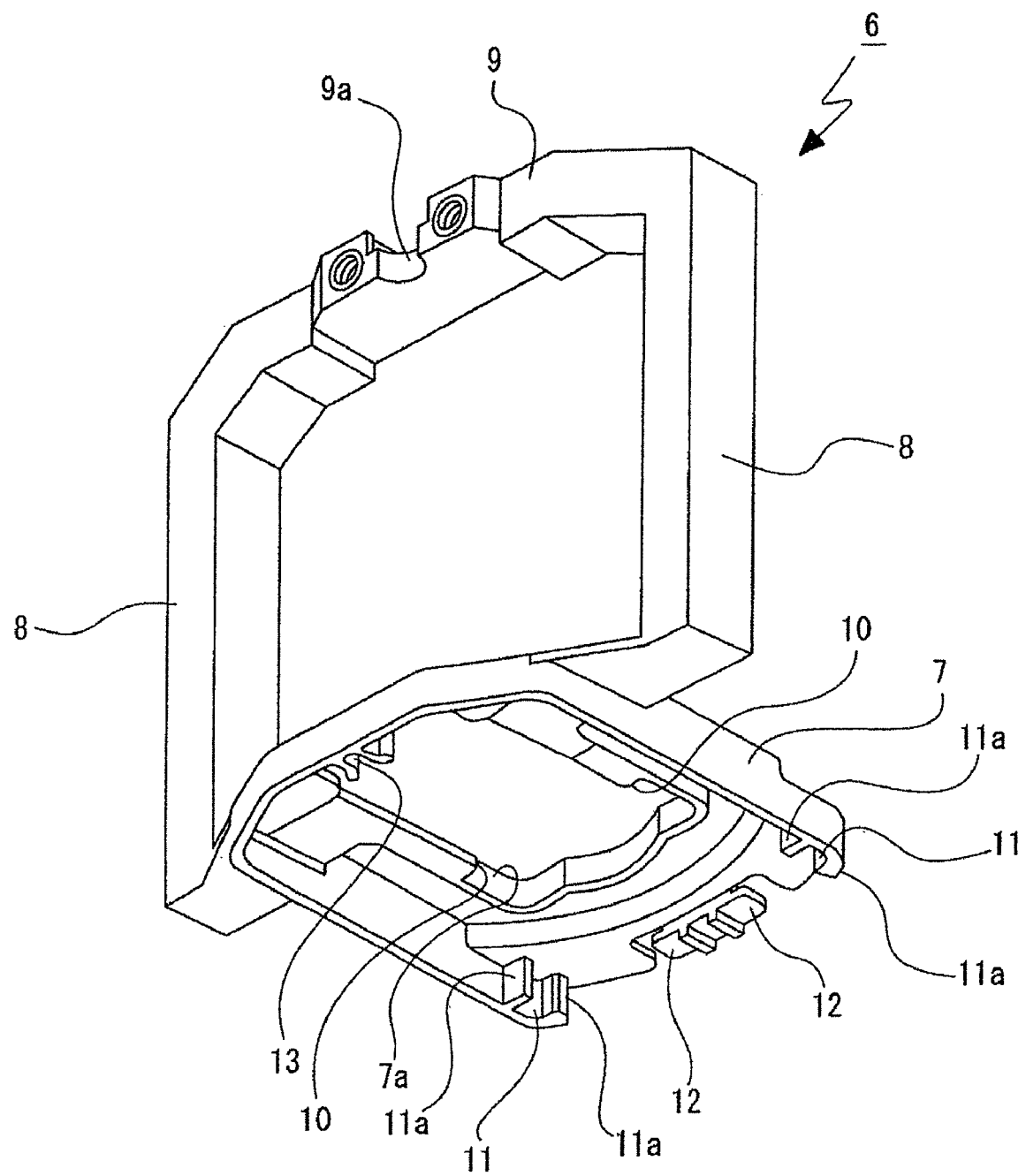
FIG. 4 is an enlarged perspective view of a support member.
Figure 5:
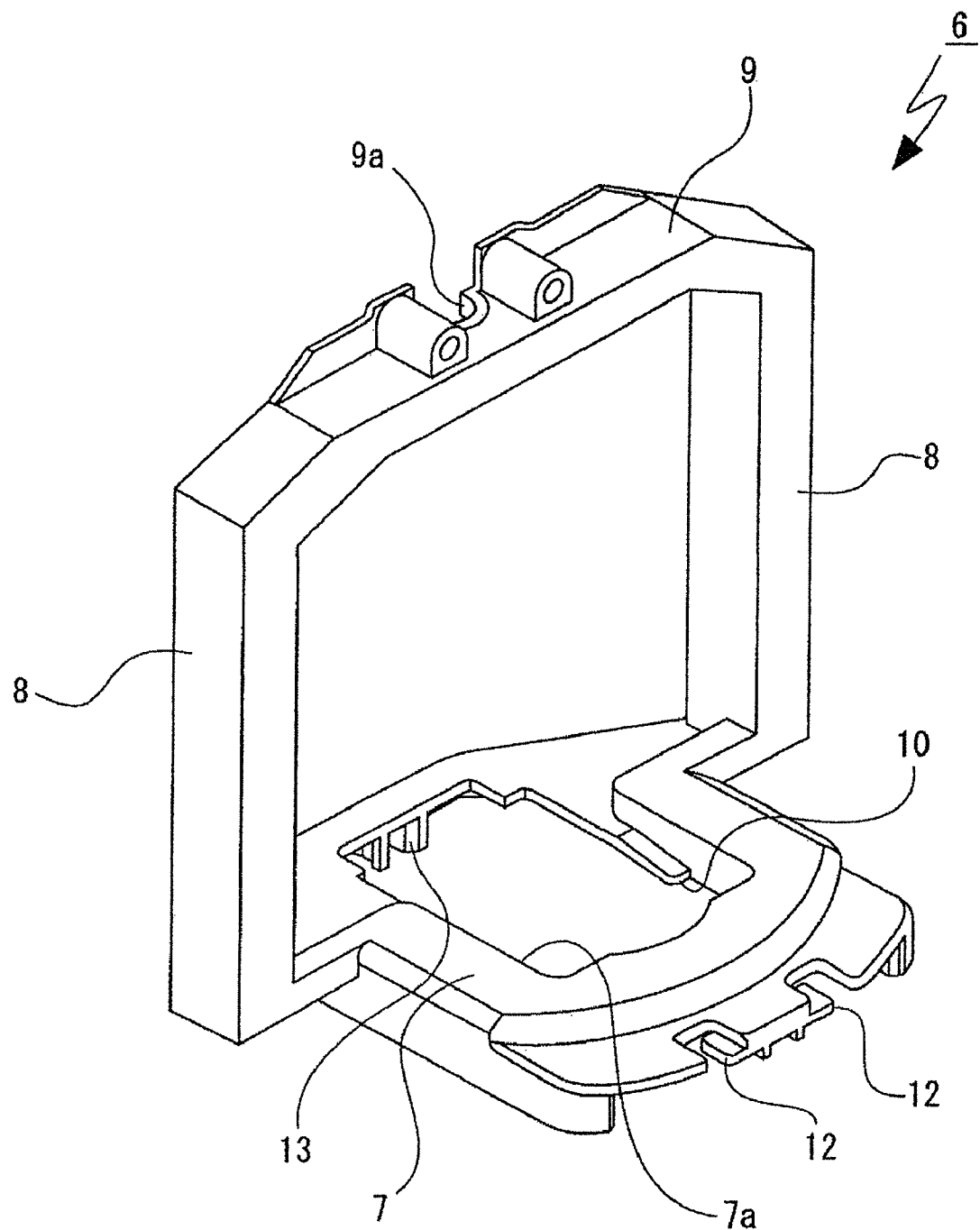
FIG. 5 is an enlarged perspective view of the support member viewed from a different direction from FIG. 4.

On the base portion 7, first support member side engagement portions 10 are provided on the right and left rims of the attachment hole 7a, respectively (see FIGS. 4 and 5). The first support member side engagement portions 10 are formed in a tongue-like shape.

At the rear end on the lower surface side of the base portion 7, second support member side engagement portions 11 are formed on the right and left ends, respectively. The second support member side engagement portions 11 are formed in a concave shape opened on the side where they are opposed to each other, i.e., the inwardly facing side. Two wall portions 11a are, respectively, separated, in the front-rear direction, from the second support member side engagement portions 11 and opposed, in the front-rear direction, to the second support member side engagement portions 11.

At the rear end of the base portion 7, third support member side engagement portions 12 are provided so as to be separated in the right-left direction. The third support member side engagement portions 12 are formed in a tongue-like shape.

At the front end on the lower surface side of the base portion 7, an engagement concave portion 13 is provided. The engagement concave portion 13 is opened on the rear side.

In the lighting chamber 5, a lamp unit 14 is disposed (see FIG. 1). The lamp unit 14 is supported by the support member 6 so as to be tiltable in the vertical direction and rotatable in the right-left direction.

The lamp unit 14 has, as shown in FIGS. 1 and 2, a reflector 15 that reflects light with an inner surface thereof, a light source 16 held at the rear end of the reflector 15, a lens holder 17 attached to the front end of the reflector 15, and a projection lens 18 held at the front end of the lens holder 17.

The reflector 15 is formed in a bowl-like shape opened on the front side, and the inner surface thereof is formed as a reflecting surface 15a. The reflecting surface 15a is a paraboloidal or an elliptical surface.

The lens holder 17 has a shade 17a, and the shade 17a is provided in a condition of protruding into the lamp unit 14. The shade 17a has the function of intercepting part of the light emitted from the light source 16.

As the light source 16, for example, a discharge lamp is used.

The lamp unit 14 is supported so as to be rotatable in the right-left direction (horizontal direction) about support shafts 19 and 20. Support shafts 19 and 20 are situated so as to be separated in the vertical direction and are provided at the upper and lower ends of the lens holder 17, respectively. The lamp unit 14 is rotated in the right-left direction in accordance with the running direction of the vehicle, and the light emitted from the light source 16 is radiated so as to follow the running direction of the vehicle.

The support shaft 19 is coupled to a spherical portion 21. The support shaft 19 is supported by the support-receiving portion 9a of the hanging portion 9 of the support member 6 by the spherical portion 21 being pressed by a pressing member 22 screwed to the hanging portion 9.

The lamp unit 14 is tiltable in the vertical direction about the spherical portion 21 by the support shaft 20 moving in the front-rear direction.

On the front end side of the lighting chamber 5, an extension 23 that shields a part of the lamp unit 14 is disposed (see FIG. 1).

To the rear end of the lamp housing 2, a back cover 24 that closes the attachment opening 2a is attached.

To the lower end of the lamp housing 2, an attachment cover 25 that closes the disposition opening 2b is attached. The attachment cover 25 is formed in a box shape opened on the upper side.

To the inside of the attachment cover 25, a discharge lamp lighter 26 is attached. The discharge lamp lighter 26 is a device for lighting the light source 16, and has a lighting circuit inside.

The discharge lamp lighter 26 is connected to the light source 16 by a cable 26a, and the cable 26a is disposed so as to range from behind to under the lamp unit 14.

Under the lamp unit 14, an actuator 27 is disposed. The actuator 27 includes a case member 28 and a driving mechanism 29 disposed in the case member 28 (see FIGS. 2 and 3).

The case member 28 includes a box-shaped disposition case 30 opened on the upper side, a lid member 31 that closes the disposition case 30, and a support portion 32 disposed over the lid member 31. The disposition case 30, the lid member 31, and the driving mechanism 29 constitute a main unit 33, and the main unit 33 is supported by the support portion 32 so as to be movable in the front-rear direction.

On the periphery of the disposition case 30, a plurality of engagement protrusions 30a are provided so as to be separated in the circumferential direction. The upper surface at the front end of the disposition case 30 is closed by a plane portion 30b, and on the plane portion 30b, stopper protrusions 30c protruding upward are provided so as to be separated in the right-left direction.

The lid member 31 is formed in a shallow box shape opened on the lower side, and a plurality of engagement pieces 31a protruding downward are provided on the periphery thereof. The engagement pieces 31a each have an engagement hole.

On the upper surface of the lid member 31, a plurality of bearing portions 31b are provided so as to be separated in the right-left direction. For example, three bearing portions 31b are provided on each of the right and left sides, and are situated so as to be separated in the front-rear direction.

In a position closer to the front end of the lid member 31, an insertion hole 31c passing through in the vertical direction is formed. On the upper surface of the lid member 31, positioning wall portions 31d extending in the front-rear direction are provided outside the bearing portions 31b, respectively.

At the rear end of the lid member 31, a disposition groove 31e passing through in the vertical direction and opened on the rear side is formed. In the wall portion forming the disposition groove 31e, an insertion groove 31f passing through in the right-left direction and opened on the lower side is formed.

At the front end of the lid member 31, protrusion insertion holes 31g passing through in the vertical direction are formed immediately before the foremost bearing portions 31b.

The driving mechanism 29 includes a swivel mechanism 34 and a leveling mechanism 35 (see FIG. 2).

The swivel mechanism 34 has a swivel motor 34a, reduction gears 34b rotated by the driving force of the swivel motor 34a, and a connecting shaft 34c rotated by receiving the driving force of the swivel motor 34a through the reduction gears 34b. The connecting shaft 34c protrudes upward from the plane portion 30b of the disposition case 30.

The leveling mechanism 35 has a leveling motor 35a, reduction gears 35b rotated by the driving force of the leveling motor 35a, and a pinion gear 35c rotated by receiving the driving force of the leveling motor 35a through the reduction gears 35b.

In the disposition case 30, a non-illustrated circuit board is disposed, and, at the front end of the circuit board, a first connector 36 and a second connector 37 are provided. The first connector 36 is for supplying power to the swivel motor 34a. The second connector 37 is for supplying power to the leveling motor 35a. The first connector 36 and the second connector 37 both partly protrude forward from the disposition case 30.

As described above, in the actuator 27, the separate first connector 36 and second connector 37 for supplying power to the swivel motor 34a and the leveling motor 35a, respectively, are provided.

Consequently, for example, when the power supply to the swivel motor 34a is shut off with the optical axis of the lamp unit 14 facing the oncoming vehicle on the opposite lane, power is supplied to the leveling motor 35a through the second connector 37, and the lamp unit 14 is tilted so that the optical axis thereof faces downward, whereby the generation of dazzling light to the oncoming vehicle can be prevented. Moreover, for example, when the power supply to the leveling motor 35a is shut off with the optical axis of the lamp unit 14 facing upward, power is supplied to the swivel motor 34a through the first connector 36, and the lamp unit 14 is rotated so that the optical axis thereof faces the side of the own lane, whereby the generation of dazzling light to the oncoming vehicle can be prevented.

The support portion 32 of the actuator 27 is constituted by an integrated combination of a thrust receiver 38 that receives the load of the lamp unit 14, shaft support portions 39 continuously provided on the right and left sides of the thrust receiver 38, respectively, and a continuously provided portion 40 continuing from the rear side of the thrust receiver 38 and continuously provided on the inside at the rear end of the shaft support members 39.

The thrust receiver 38 is formed in a substantially rectangular shape elongated in the front-rear direction, and has a shaft insertion hole 38a passing through in the vertical direction and elongated in the front-rear direction. The upper opening rim of the shaft insertion hole 38a of the thrust receiver 38 is a slide surface 38b formed in a gentle arc surface shape that is convex downward. On the front surface of the thrust receiver 38, an engagement protrusion 38c protruding forward is provided.

At the rear end of the thrust receiver 38, tongue-shaped receiver side engagement portions 38d are provided so as to be separated in the right-left direction.

The shaft support portions 39 are elongated in the front-rear direction, and on the lower surface sides thereof, a plurality of non-illustrated shaft holding portions are provided so as to be separated in the front-rear direction.

In positions closer to the rear end of the shaft support portions 39, elastic engagement portions 41 protruding outward are provided. The elastic engagement portions 41 are each formed so as to protrude outward from the shaft support portion 39 and, then, further largely protrude rearward. The elastic engagement portions 41 have an engagement protrusion 41a protruding outward at the rear end.

On the upper surface side of the continuously provided portion 40, engagement protrusions 40a are provided so as to be separated in the right-left direction. On the lower surface side of the continuously provided portion 40, a rack 40b protruding downward and extending in the front-rear direction is provided.

Hereinafter, the assembly of the actuator 27 will be described.

The support portion 32 is placed on the upper side of the lid member 31. At this time, the positioning wall portions 31d of the lid member 31 are situated along the outside edges of the shaft support portions 39 of the support portion 32, respectively, to position the lid member 31 and the support portion 32. Under the condition where the support portion 32 is disposed on the upper side of the lid member 31, the rack 40b of the support portion 32 is inserted in the disposition groove 31e of the lid member 31.

Under the condition where the support portion 32 is disposed on the upper side of the lid member 31, guide shafts 42 are inserted into the bearing portions 31b of the lid member 31 and the shaft holding portions of the support portion 32 from the front. The rear ends of the guide shafts 42 are held by the rearmost bearing portions 31b, whereby the insertion is completed. Under the condition where the insertion into the bearing portions 31b of the lid member 31 and the shaft holding portions of the support portion 32 is completed, the front ends of the guide shafts 42 are inserted in the foremost bearing portions 31b.

Then, the disposition case 30 where the driving mechanism 29 is disposed is closed from above by the lid member 31, and the engagement pieces 31a of the lid member 31 are engaged with the engagement protrusions 30a of the disposition case 30, respectively, whereby the lid member 31 is coupled to the disposition case 30.

Under the condition where the lid member 31 is coupled to the disposition case 30, the connecting shaft 34c of the swivel mechanism 34 protrudes upward out of the insertion hole 31c of the lid member 31, and the connecting shaft 34c is disposed in the shaft insertion hole 38a formed through the thrust receiver 38 of the support portion 32.

Under the condition where the lid member 31 is coupled to the disposition case 30, the pinion gear 35c of the leveling mechanism 35 partly protrudes from the insertion groove 31f into the disposition groove 31e of the lid member 31. Consequently, the pinion gear 35c is meshed with the rack 40b of the support portion 32 inserted in the disposition groove 31e.

Further, when the lid member 31 is coupled to the disposition case 30, the stopper protrusions 30c provided on the plane portion 30b of the disposition case 30 are inserted into the protrusion insertion holes 31g of the lid member 31 from below so as to abut on, or to be situated close to, the front surfaces of the guide shafts 42, so that the forward movements of the guide shafts 42 are restricted by the stopper protrusions 30c.

The assembly of the actuator 27 is completed as described above, so that the main unit 33 having the disposition case 30 and the lid member 31 is supported so as to be movable in the front-rear direction by the support portion 32 through the guide shafts 42.

The support shaft 20 of the lamp unit 14 is inserted in a washer 50. The lower surface of the washer 50 is formed in a gentle arc surface shape that is convex downward, in correspondence with the slide surface 38b of the thrust receiver 38.

Next, the attachment of the actuator 27 to the support member 6 will be described (see FIGS. 6 and 7). For simplification, as the actuator 27, only the support portion 32 is shown in FIGS. 6 and 7.

First, the upper end of the support portion 32 of the actuator 27 is inserted into the attachment hole 7a of the support member 6 from below.

Figure 6:
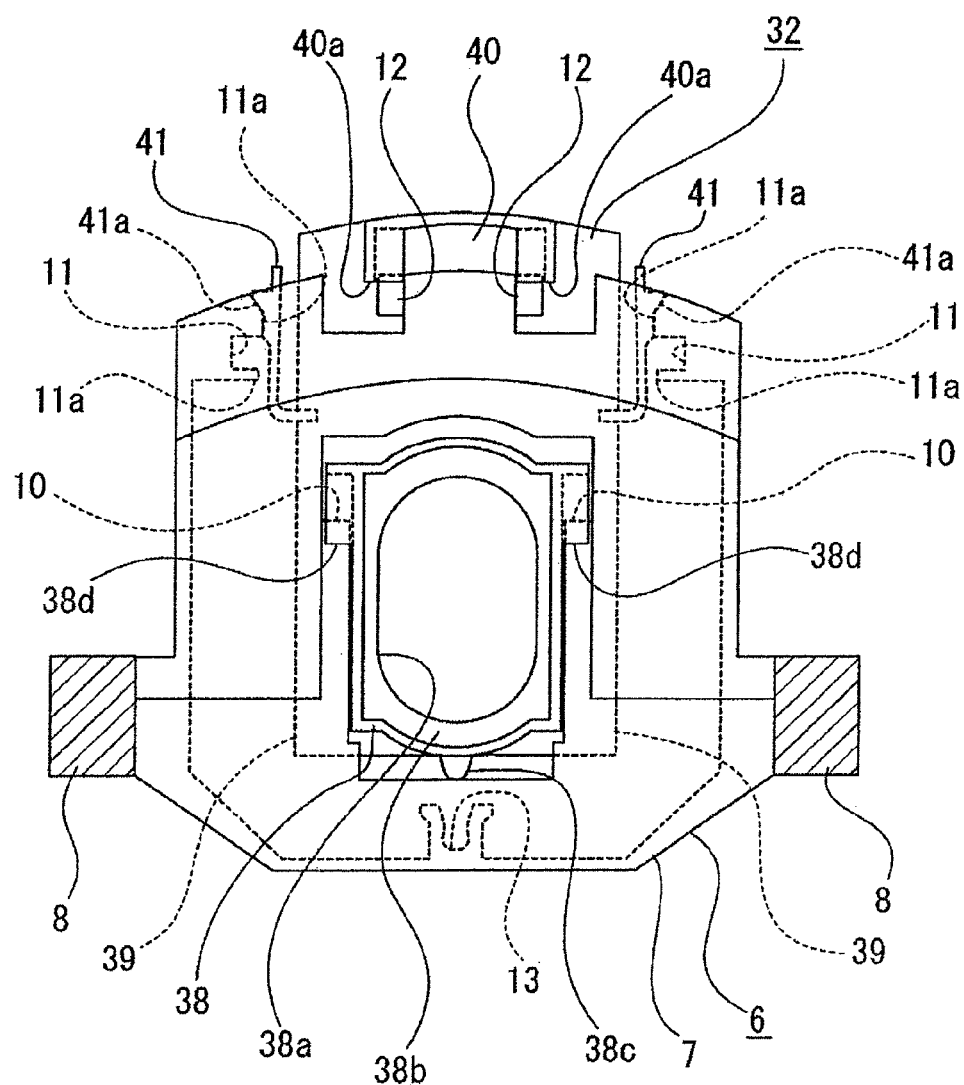
FIG. 6 is a schematic plan view showing, partly in cross section, a condition where an actuator is in the process of being attached to the support member.
Figure 7:
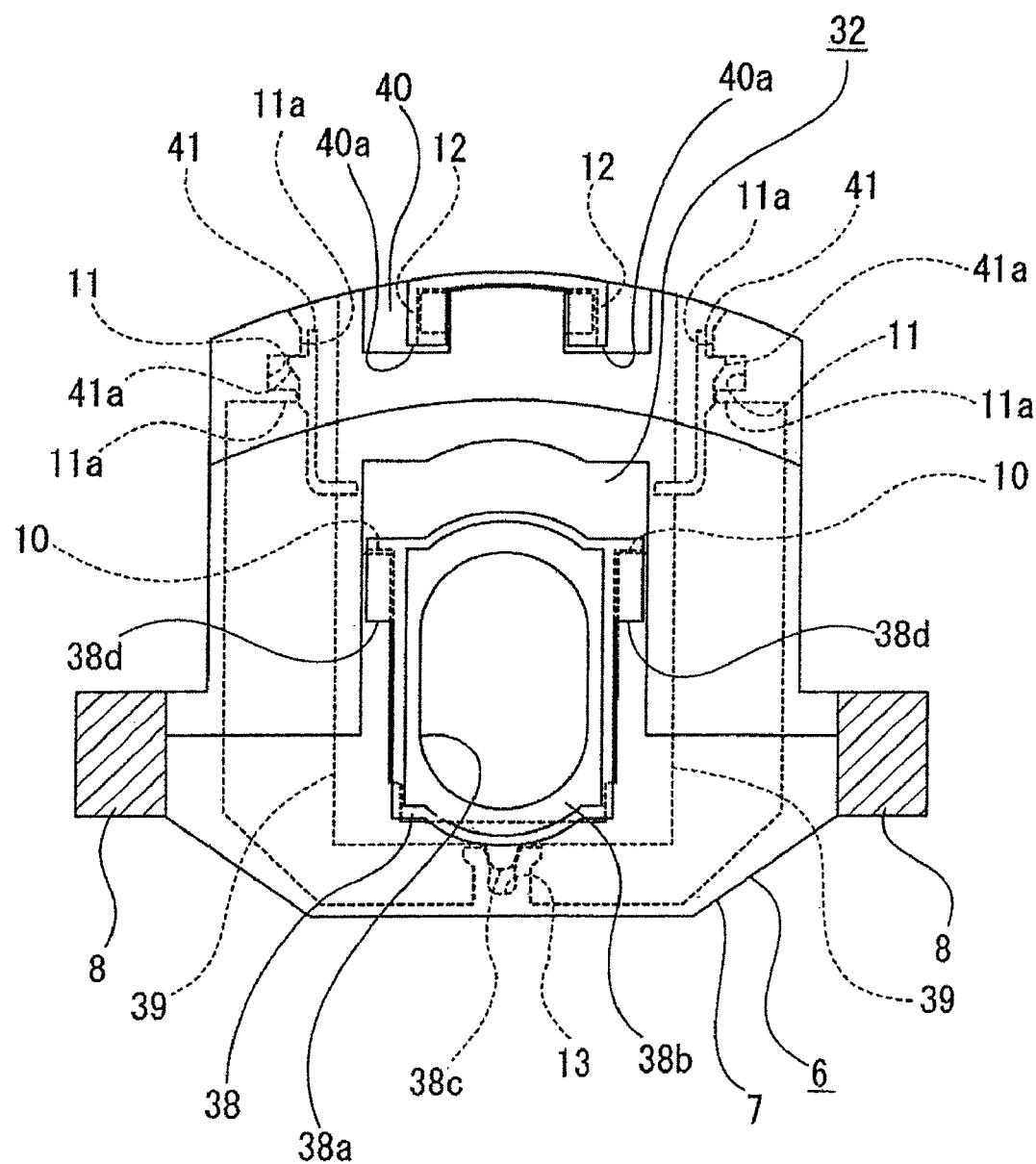
FIG. 7 is a schematic plan view showing, partly in cross section, a condition where the actuator is attached to the support member.

Then, the actuator 27 is moved forward with respect to the support member 6, the receiver side engagement portions 38d are engaged with the first support member side engagement portions 10 from above, and the engagement portions 40a are engaged with the third support member side engagement portions 12 from above (see FIG. 6).

Then, the actuator 27 is further moved forward with respect to the support member 6. The receiver side engagement portions 38d are continuously engaged with the first support member side engagement portions 10 from above, and the engagement portions 40a are continuously engaged with the third support member side engagement portions 12 from above. At this time, the engagement protrusions 41a of the elastic engagement portions 41 are slid on the wall portions 11a on the rear side constituting the second support member side engagement portions 11 of the support member 6, so that the elastic engagement portions 41 are elastically deformed. Then, the elastic engagement portions 41 are elastically returned, so that the engagement protrusions 41a are engaged with the second support member side engagement portions 11 (see FIG. 7). At the same time, the engagement protrusion 38c of the actuator 27 is engaged with the engagement concave portion 13 of the support member 6.

As described above, the receiver side engagement portions 38d are engaged with the first support member side engagement portions 10 from above, the engagement protrusions 40a are engaged with the third support member side engagement portions 12 from above, the engagement protrusions 41a of the elastic engagement portions 41 are engaged with the second support member side engagement portions 11, and the engagement protrusion 38c is engaged with the engagement concave portion 13 of the support member 6, whereby the attachment of the actuator 27 to the support member 6 is completed.

Under the condition where the actuator 27 is attached to the support member 6, the support shaft 20 under the lamp unit 14 is coupled to the connecting shaft 34c on the driving mechanism 29 of the actuator 27 in a condition of being inserted in the washer 50. Under the condition where the support shaft 20 is coupled to the connecting shaft 34c, the lower surface of the washer 50 is slidable on the slide surface 38b of the thrust receiver 38 of the actuator 27.

Under the condition where the lamp unit 14 is coupled to the actuator 27 as described above, when the swivel motor 34a is rotated, the driving force of the swivel motor 34a is transmitted to the lamp unit 14 through the connecting shaft 34c, so that the lamp unit 14 is rotated about the support shafts 19 and 20 in the right-left direction in accordance with the rotation direction of the swivel motor 34a to perform the swivel operation.

When the leveling motor 35a is rotated, the driving force of the leveling motor 35a is transmitted to the rack 40b through the pinion gear 35c. When the driving force of the leveling motor 35a is transmitted to the rack 40b, the main unit 33 is moved in the front-rear direction in accordance with the rotation direction of the leveling motor 35a with respect to the support portion 32 by being guided by the guide shafts 42, and the lamp unit 14 is tilted about the spherical portion 21 in the vertical direction with the movement of the main unit 33 to perform the leveling operation.

As described above, because the actuator 27 is constituted by the main unit 33, which has the driving mechanism 29 and moves in the front-rear direction to tilt the lamp unit 14 in the vertical direction, and the support portion 32, which supports the main unit 33 attached to the support member 6 so as to be movable in the front-rear direction, the lamp unit 14 can be smoothly tilted with a simple structure.

Figure 8:
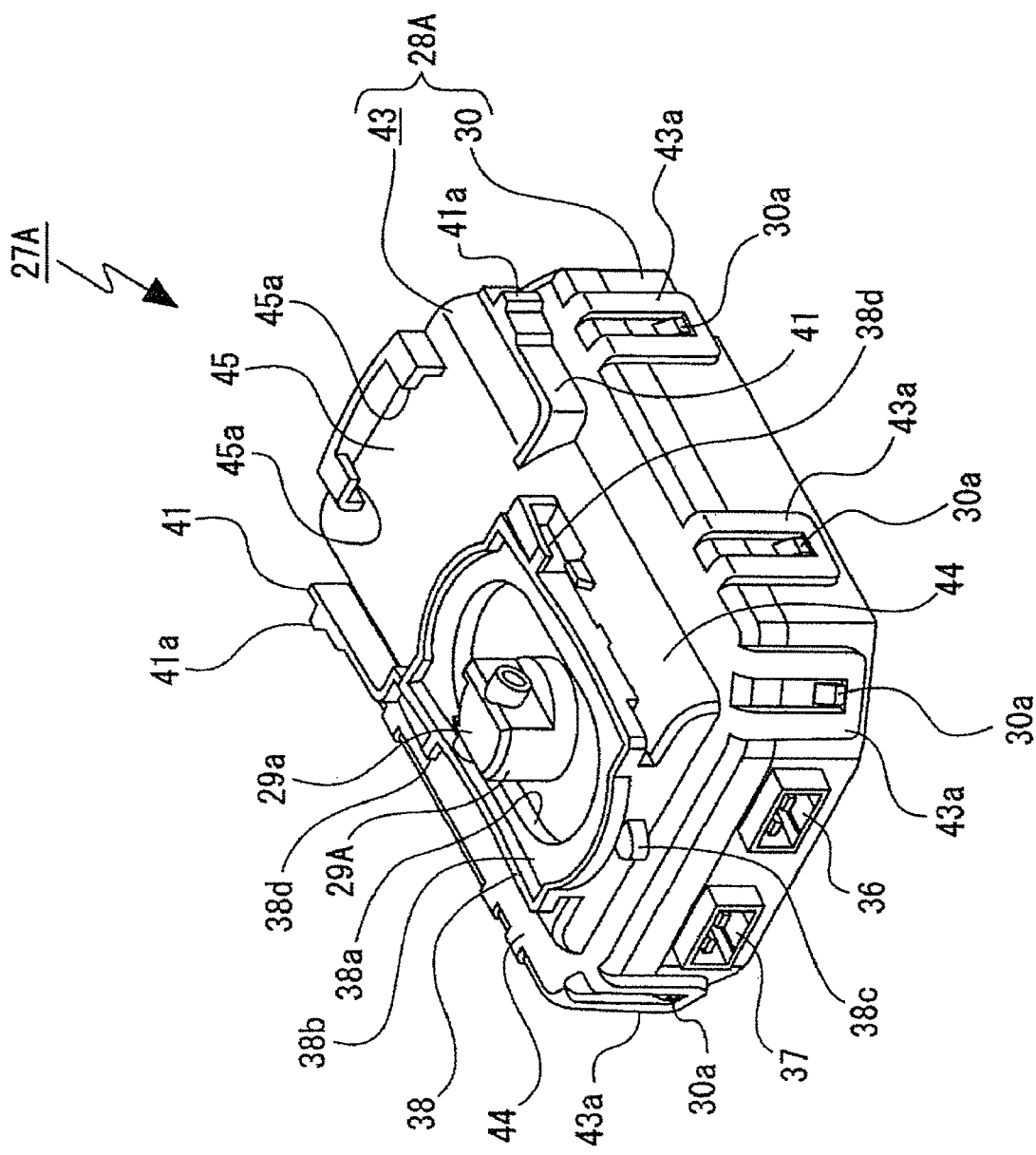
FIG. 8 is a perspective view showing an actuator according to a modification.

Next, a modification of the actuator will be described (see FIG. 8).

Because an actuator 27A according to the modification shown below is different from the above-described actuator 27 only in that the structure of the case member is different and that at least a part of the driving mechanism moves in the front-rear direction, only parts different from those of the actuator 27 are described in detail, and the other parts are denoted by the same reference numerals as those of similar parts of the actuator 27, and will not be described or will be described briefly.

The actuator 27A includes a case member 28A and a driving mechanism 29A disposed in the case member 28A.

The case member 28A includes the box-shaped disposition case 30 opened on the upper side and a lid member 43 that closes the disposition case 30.

The lid member 43 is formed in a shallow box shape opened on the lower side, and a plurality of engagement pieces 43a protruding downward are provided on the periphery thereof. The engagement pieces 43a each have an engagement hole.

The driving mechanism 29A serves both as the swivel mechanism and the leveling mechanism, and has a connecting shaft 29a and a non-illustrated swivel and leveling motors.

In the disposition case 30, a non-illustrated circuit board is disposed, and at the front end of the circuit board, a first connector 36, and a second connector 37 are provided as in the actuator 27. Consequently, as in the actuator 27, when the power supply to the swivel motor or the power supply to the leveling motor is shut off, by supplying power to the leveling motor or supplying power to the swivel motor, respectively, the generation of dazzling light to the oncoming vehicle can be prevented.

In the driving mechanism 29A, when power is supplied to the swivel motor through the first connector 36, the connecting shaft 29a is rotated in the axial rotation direction in accordance with the rotation direction of the swivel motor, and when power is supplied to the leveling motor through the second connector 37, the connecting shaft 29a moves the shaft insertion hole 38a in the front-rear direction in accordance with the rotation direction of the leveling motor.

The lid member 43 of the actuator 27A is constituted by an integrated combination of the thrust receiver 38 that receives the load of the lamp unit 14, side portions 44 continuously provided on the right and left sides of the thrust receiver 38, respectively, and a continuously provided portion 45 continuing from the rear side of the thrust receiver 38 and continuously provided on the inside at the rear end of the side portions 44.

In positions closer to the rear end of the side portions 44, the elastic engagement portions 41 protruding outward are provided.

On the upper surface side of the continuously provided portion 45, engagement protrusions 45a are provided so as to be separated in the right-left direction.

The disposition case 30 where the driving mechanism 29A is disposed is closed from above by the lid member 43 and the engagement pieces 43a of the lid member 43 are engaged with the engagement protrusions 30a of the disposition case 30, respectively, to couple the lid member 43 to the disposition case 30, whereby the actuator 27 is structured.

Under the condition where the lid member 43 is coupled to the disposition case 30, the connecting shaft 29a of the driving mechanism 29A protrudes upward out of the shaft insertion hole 38a of the lid member 43.

Hereinafter, the attachment of the actuator 27A to the support member 6 will be described.

First, the lid member 43 of the actuator 27A is inserted into the attachment hole 7a of the support member 6 from below.

Then, the actuator 27A is moved forward with respect to the support member 6, the receiver side engagement portions 38d are engaged with the first support member side engagement portions 10 from above, and the engagement protrusions 45a are engaged with the third support member side engagement portions 12 from above.

Then, the actuator 27A is further moved forward with respect to the support member 6. The receiver side engagement portions 38d are continuously engaged with the first support member side engagement portions 10 from above, and the engagement protrusions 45a are continuously engaged with the third support member side engagement portions 12 from above. At this time, the engagement protrusions 41a of the elastic engagement portions 41 are slid on the wall portions 11a on the rear side constituting the second support member side engagement portions 11 of the support member 6, so that the elastic engagement portions 41 are elastically deformed. Then, the elastic engagement portions 41 are elastically returned, so that the engagement protrusions 41a are engaged with the second support member side engagement portions 11. At the same time, the engagement protrusion 38c of the actuator 27A is engaged with the engagement concave portion 13 of the support member 6.

As described above, the receiver side engagement portions 38d are engaged with the first support member side engagement portions 10 from above, the engagement protrusions 45a are engaged with the third support member side engagement portions 12 from above, the engagement protrusions 41a of the elastic engagement portions 41 are engaged with the second support member side engagement portions 11, and the engagement protrusion 38c is engaged with the engagement concave portion 13 of the support member 6, whereby the attachment of the actuator 27A to the support member 6 is completed.

Under the condition where the actuator 27A is attached to the support member 6, the connecting shaft 29a of the driving mechanism 29A is disposed in the shaft insertion hole 38a formed through the thrust receiver 38 of the lid member 43, and the support shaft 20 under the lamp unit 14 is coupled to the connecting shaft 29a in a condition of being inserted in the washer 50. Under the condition where the support shaft 20 is coupled to the connecting shaft 29a, the lower surface of the washer 50 is slidable on the slide surface 38b of the thrust receiver 38 of the actuator 27A.

Under the condition where the lamp unit 14 is coupled to the actuator 27A as described above, when the swivel motor is rotated, the driving force of the swivel motor is transmitted to the lamp unit 14 through the connecting shaft 29a, so that the lamp unit 14 is rotated about the support shafts 19 and 20 in the right-left direction in accordance with the rotation direction of the swivel motor to perform the swivel operation.

When the leveling motor is rotated, the driving force of the leveling motor is transmitted to the lamp unit 14 through the connecting shaft 29a, and the lamp unit 14 is tilted about the spherical portion 21 in the vertical direction to perform the leveling operation.

As described above, in the actuator 27A, the lamp unit 14 is tilted in the vertical direction by moving the connecting shaft 29a of the driving mechanism 29A in the front-rear direction. Thus, the lamp unit 14 can be smoothly tilted with a simple structure.

Moreover, in the actuator 27A, the case member 28A of the actuator 27A is constituted by the disposition case 30 and the lid member 43 and the thrust receiver 38 is integrally formed on the lid member 43. Thus, the number of parts can be reduced.

As described above, in the vehicle headlight 1, because the thrust receiver 38 that receives the load of the lamp unit 14 is integrally provided on the case members 28 and 28A of the actuators 27 and 27A, it is unnecessary to attach the actuators 27 and 27A to predetermined parts after the thrust receiver 28 is attached to the support member 6. Thus, the number of steps of the assembly process is small and the workability in the assembly can be improved.

Moreover, the support member 6 is provided with the first support member side engagement portions 10, and the thrust receiver 38 is provided with the receiver side engagement portions 38d engaged with the support member side engagement portions 10. Thus, the case members 28 and 28A of the actuators 27 and 27A can be attached to the support member 6.

Consequently, the case members 28 and 28A can be easily attached to the support member 6 while the structures of the actuators 27 and 27A are simple.

Further, in the vehicle headlight 1, the case members 28 and 28A are provided with the elastically deformable elastic engagement portions 41, and the elastic engagement portions 41 are elastically deformed to be engaged with the second support member side engagement portions 11, whereby the actuators 27 and 27A are attached to the support member 6.

Consequently, the actuators 27 and 27A can be easily and reliably attached to the support member 6.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

EXPLANATION OF REFERENCE NUMERALS

1: Vehicle headlight;
2: lamp housing;
3: cover;
4: lighting casing;
6: support member;
10: first support member side engagement portion;
11: second support member side engagement portion;
14: lamp unit;
15: reflector;
16: light source;
27: actuator;
28: case member;
29: driving mechanism;
32: support portion;
33: main unit;
38: thrust receiver;
38d: receiver side engagement portion;
41: elastic engagement portion;
27A: actuator;
28A: case member;
29A: driving mechanism

What is claimed is:

1. A vehicle head light comprising:
a lighting casing comprising
a lamp housing opened on one side and
a cover that closes the opening of the lamp housing;
a lamp unit disposed in the lighting casing;
a support member that supports the lamp unit so as to be rotatable at least in two directions;
an actuator that rotates the lamp unit with respect to the support member; and
a thrust receiver that receives a load of the lamp unit,
wherein the actuator is disposed under the lamp unit,
wherein a lower end of the lamp unit is coupled to the actuator,
wherein the actuator comprises:
a case member; and
a driving mechanism disposed in the case member,
wherein the lamp unit is coupled to the driving mechanism,
wherein the thrust receiver is integrally provided on the case member of the actuator, and
wherein the actuator comprises: a main unit comprising the driving mechanism; and a support portion attached to the support member, wherein the main unit moves in a front-rear direction to rotate the lamp unit in a predetermined direction, and wherein the support portion supports the main unit so as to be movable in the front-rear direction.

2. The vehicle headlight according to claim 1, wherein the support member is provided with a support member side engagement portion, wherein the thrust receiver is provided with a receiver side engagement portion that is engaged with the support member side engagement portion, and wherein the receiver side engagement portion is engaged with the support member side engagement portion so that at least a part of the case member of the actuator is attached to the support member.

3. The vehicle headlight according to claim 2, wherein a plurality of said support member side engagement portions of the support member are provided, wherein the case member is provided with an elastically deformable elastic engagement portion, and wherein the elastic engagement portion of the case member is elastically deformed to be engaged with at least one of the support member side engagement portions of the support member.

4. A vehicle head light comprising:
a lighting casing comprising
a lamp housing opened on one side and
a cover that closes the opening of the lamp housing;
a lamp unit disposed in the lighting casing;
a support member that supports the lamp unit so as to be rotatable at least in two directions;
an actuator that rotates the lamp unit with respect to the support member; and
a thrust receiver that receives a load of the lamp unit,
wherein the actuator is disposed under the lamp unit,
wherein a lower end of the lamp unit is coupled to the actuator,
wherein the actuator comprises:
a case member; and
a driving mechanism disposed in the case member,
wherein the lamp unit is coupled to the driving mechanism,
wherein the thrust receiver is integrally provided on the case member of the actuator, and
wherein the support member is provided with a support member side engagement portion, wherein the thrust receiver is provided with a receiver side engagement portion that is engaged with the support member side engagement portion, and wherein the receiver side engagement portion is engaged with the support member side engagement portion so that at least a part of the case member of the actuator is attached to the support member.

5. The vehicle headlight according to claim 4, wherein a plurality of said support member side engagement portions of the support member are provided, wherein the case member is provided with an elastically deformable elastic engagement portion, and wherein the elastic engagement portion of the case member is elastically deformed to be engaged with at least one of the support member side engagement portions of the support member.

6. The vehicle headlight according to claim 5, wherein the lamp unit comprising a light source and a reflector that reflects light emitted from the light source.

7. A vehicle head light comprising:
   a lighting casing comprising
      a lamp housing opened on one side and
      a cover that closes the opening of the lamp housing;
   a lamp unit disposed in the lighting casing;
   a support member that supports the lamp unit so as to be rotatable at least in two directions;
   an actuator that rotates the lamp unit with respect to the support member; and
   a thrust receiver that receives a load of the lamp unit,
   wherein the actuator is disposed under the lamp unit,
      wherein a lower end of the lamp unit is coupled to the actuator,
   wherein the actuator comprises:
      a case member; and
      a driving mechanism disposed in the case member,
   wherein the lamp unit is coupled to the driving mechanism,
   wherein the thrust receiver is integrally provided on the case member of the actuator, and
   wherein at least a part of the driving mechanism moves in a front-rear direction to rotate the lamp unit in a predetermined direction.

8. The vehicle headlight according to claim 7, wherein the support member is provided with a support member side engagement portion, wherein the thrust receiver is provided with a receiver side engagement portion that is engaged with the member side engagement portion, and wherein the receiver side engagement portion is engaged with the support member side engagement portion so that at least a part of the case member of the actuator is attached to the support member.

9. The vehicle headlight according to claim 8, wherein a plurality of said support member side engagement portions of the support member are provided, wherein the case member is provided with an elastically deformable elastic engagement portion, and wherein the elastic engagement portion of the case member is elastically deformed to be engaged with at least one of the support member side engagement portions of the support member.

* * * * *